Nov. 20, 1934. C. A. HANSON 1,981,103
MOLD FOR NET LEADS
Filed April 20, 1933  2 Sheets-Sheet 1
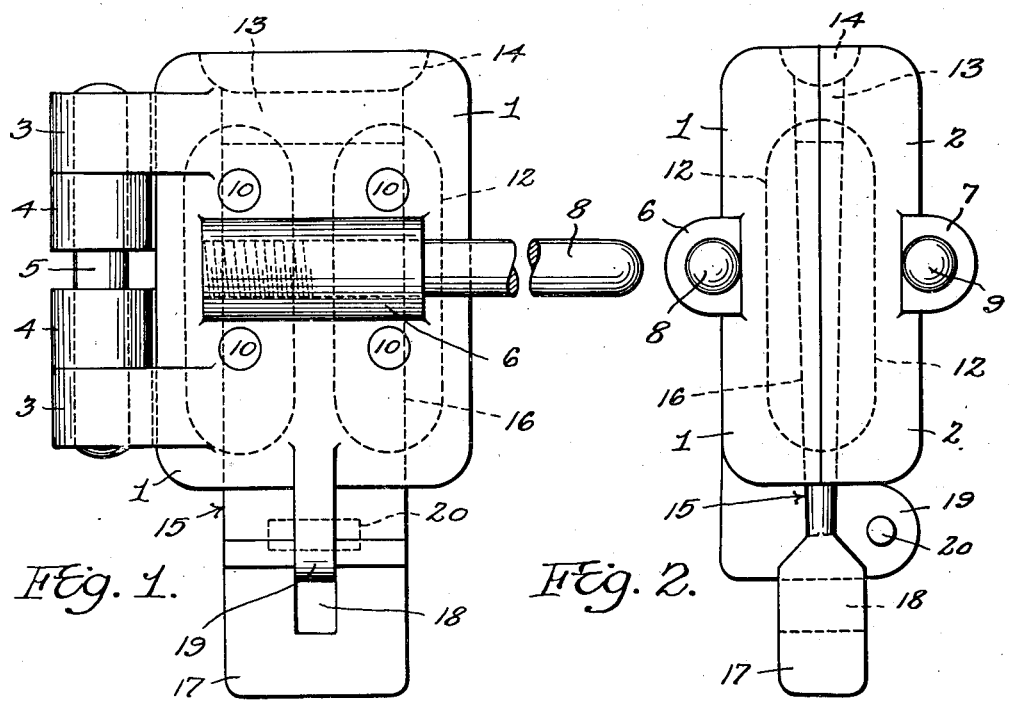
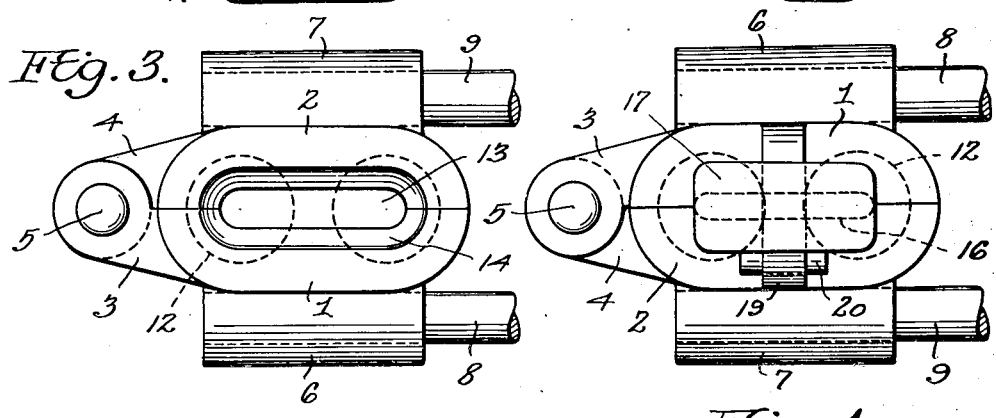
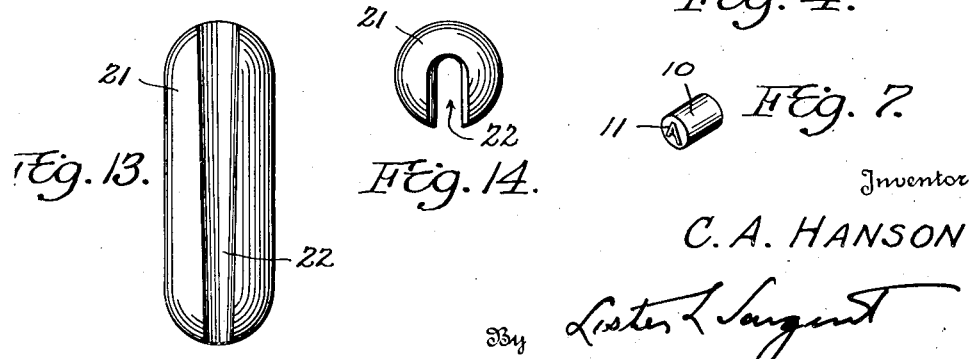
Inventor
C. A. HANSON

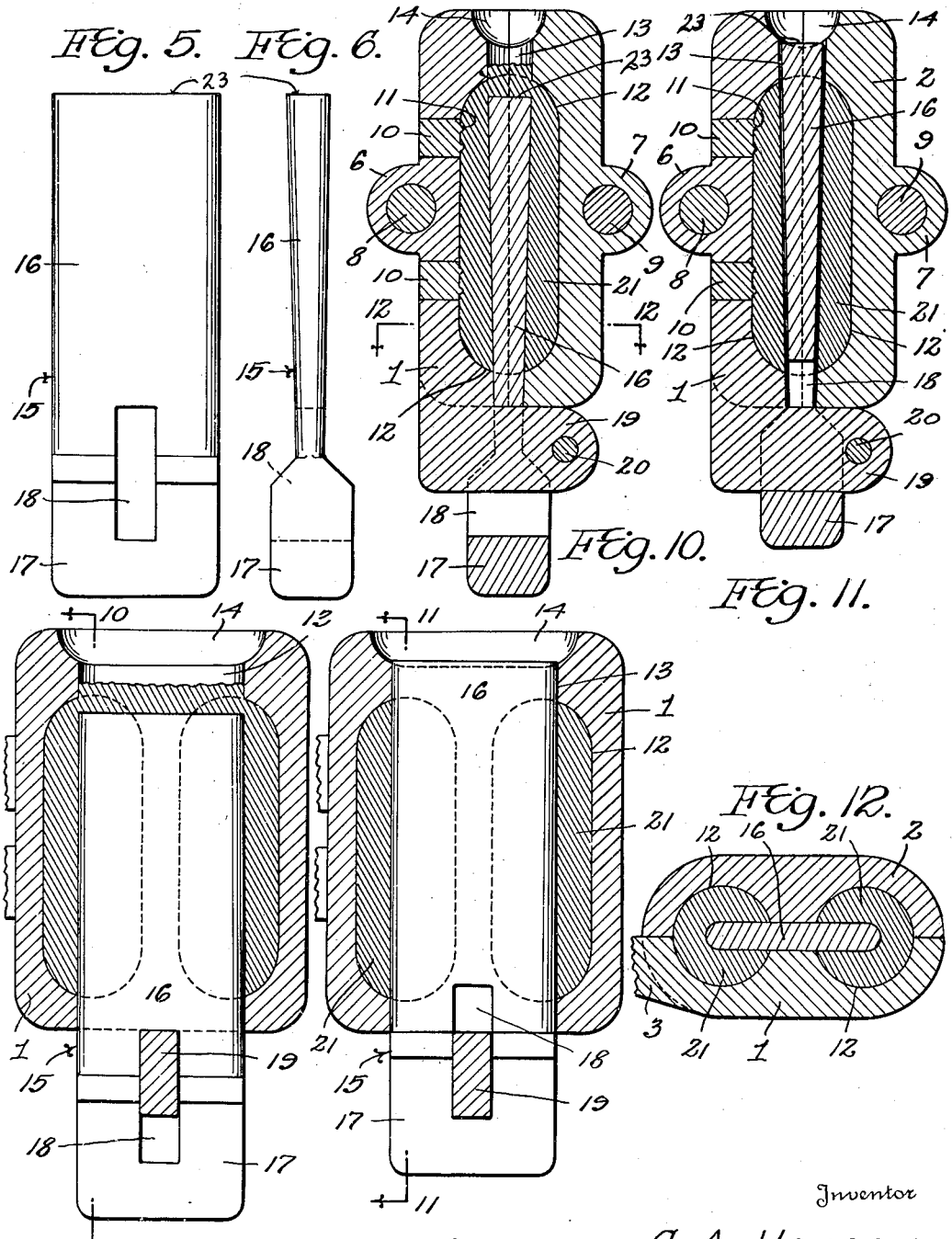

Patented Nov. 20, 1934

1,981,103

UNITED STATES PATENT OFFICE 1,981,103

MOLD FOR NET LEADS

Charles A. Hanson, Munising, Mich.

Application April 20, 1933, Serial No. 667,093

2 Claims. (Cl. 22—150)

The object of my invention is to provide an improved mold for use in molding the net leads which are used by commercial fishermen for making their net leads; and to provide novel means for cutting the pouring gate and eliminating trimming of the leads after they are dumped from the mold.

Another object of my invention is to eliminate the sticking of leads in the molds. I attain these and other objects of my invention by the device illustrated in the accompanying drawings, in which—

Figure 1 is a left side elevation of the mold;

Fig. 2 is an end elevation of the mold;

Fig. 3 is a top plan view of the mold;

Fig. 4 is a bottom plan view of the mold;

Fig. 5 is a side elevation of the slide 15;

Fig. 6 is an edge elevation of same;

Fig. 7 is a detail perspective view of the marking plug 10;

Fig. 8 is a vertical section through the mold with the mold cavities filled with lead;

Fig. 9 is a similar view but with the pouring gate cut and removed;

Fig. 10 is a transverse vertical section on line 10—10 of Fig. 8;

Fig. 11 is a transverse vertical section on line 11—11 of Fig. 9;

Fig. 12 is a transverse horizontal section on line 12—12 of Fig. 10;

Fig. 13 is a front elevation of the molded net lead as it is withdrawn from the mold; and Fig. 14 is a top plan view of same.

Like numerals designate like parts in each of the several views.

Referring to the accompanying drawings, I provide a mold form 1 having a hinge 3 and a mold form 2 having a hinge 4 and a pintle 5. Form 1 has a boss 6 to which is attached a handle bar 8, and form 2 has a boss 7 to which is attached a like handle bar 9 which may be threaded or otherwise suitably secured at the boss. I provide removable marking plugs 10 in the mold, these marking plugs having an identification mark or letter on the face thereof as shown in Fig. 7. The mold forms 1 and 2 are provided with like cavities 12 which preferably are substantially cylindrical as shown. I provide a gateway or channel 13 opening into cavities 12 and a funnel top 14 for this channel, as shown in Figs. 5-9. I provide a beveled slide 15 inserted in a suitable opening in the bottom of the mold and normally extending to a point slightly short of the lower end of the channel 13, as shown in Figs. 8 and 10. This slide comprises a reversely beveled tongue 16 which is inserted in the mold as shown in the drawings, the slide also having a head or butt 17 projecting outside of the mold, this head being provided with a longitudinal slot 18 through which the flange or ear 19 of the mold projects. The ear 19 is integral with mold member 1 as shown in Figs. 10 and 11. I provide a pin 20 inserted in the ear 19 and positioned so that its near surface is substantially aligned with the outer adjacent edge or surface of the head or butt 17 as shown in Fig. 2.

Referring to Fig. 13, there is illustrated the completed lead 21 as molded, the lead having a longitudinal groove 22 which is formed by the beveled tongue 16 of slide 15.

In using the invention the slide 15 is inserted in the mold in the position shown in Fig. 10. The lead is then poured through the funnel top 14 and the channel 13 into the mold cavity 12 until the cavity is filled. This operation leaves a small amount of lead in the channel 13. This lead is ejected by striking the head or butt 17 on a suitable anvil thereby forcing the slide upwards to the extent that aperture 18 and ear 19 permit, in which position the slide is disposed as shown in Figs. 9 and 11. When driven to this position it has forced the portion of the lead in the channel 13 outwardly and thereby eliminated the usual step of trimming the lead after the lead has been removed from the mold.

The tongue 16 which is slidably mounted in the mold, is flat and is blade-like in order to form the line slots 22 in the leads. The outside end 17 is enlarged and square to form a butt for striking. The inside end 23 of the blade is ground square and serves to cut the pour gate. It is striking the butt end of the tongue which causes it to slide upwardly and cut the lead in the gateway 13.

The second object of the mold is accomplished by the gradual diminishing of the cross-sectional area of the tongue 16 from the cutting end 23 toward the butt 17. By pouring into the new mold while the blade is in the "down" position the line slots of the leads are formed around the large end of the tapered blade. Striking the mold causes the tongue to slide upwardly the smaller portions of the blade or tongue 16 displacing the larger and leaving the leads 21 free of the blade 16. Since the same motion that frees the leads of the tongue also cuts them free of the gate and since the lead in solidifying shrinks away from the cavity walls, they are free to fall out of the mold.

When making leads the mold is held by the handles in one hand, the pour gate 13 being up.

The molten lead is then poured into the gate. Next the mold is struck hammer fashion on a wooden block. The pour gate is in this way shorn off and thrown clear of the mold and the leads are loosened. The mold is then opened and tilted allowing the two finished net leads to drop out.

I use a metal having a high rate of conductivity, a high coefficient of expansion, and at the same time one which has no affinity at the temperatures encountered in normal operation. All these factors tend to increase the speed possible in casting and eliminate any possible freezing of the casting in the mold, while at the same time maintaining a perfectly cylindrical casting.

What I claim is:—

1. In a mold for net leads, the combination of a pair of mold forms, hinged to each other, handles attached to each of the mold forms, the mold forms having complementary recesses which when the mold forms are assembled define a pair of cylindrical casting cavities in the mold, the mold forms having a funnel top, a channel extending from the funnel top into the recesses, a slide member having a reversely beveled tongue insertable into the mold forms from the bottom thereof, the slide also having a butt projecting outside the mold forms, a longitudinal slot in the butt end of the slide member, an ear on one of the mold forms extending through the aforesaid slot in the slide member whereby to limit the longitudinal movement of said slide member.

2. In a mold for net leads, the combination of a pair of mold forms hinged to each other, handles attached to each of the mold forms, the mold forms having complementary recesses which when the mold forms are assembled define a pair of cylindrical casting cavities in the mold, the mold forms having a funnel top, a channel extending from the funnel top into the recess, a slide member having a reversely beveled tongue insertable into the mold forms from the bottom thereof, the slide also having a butt projecting outside the mold forms, and means for limiting the longitudinal movement of the slide member.

CHARLES A. HANSON.